C. P. SESTER.
DISTRIBUTING MACHINE.
APPLICATION FILED JULY 22, 1912.
1,050,569.
Patented Jan. 14, 1913.
4 SHEETS—SHEET 1.
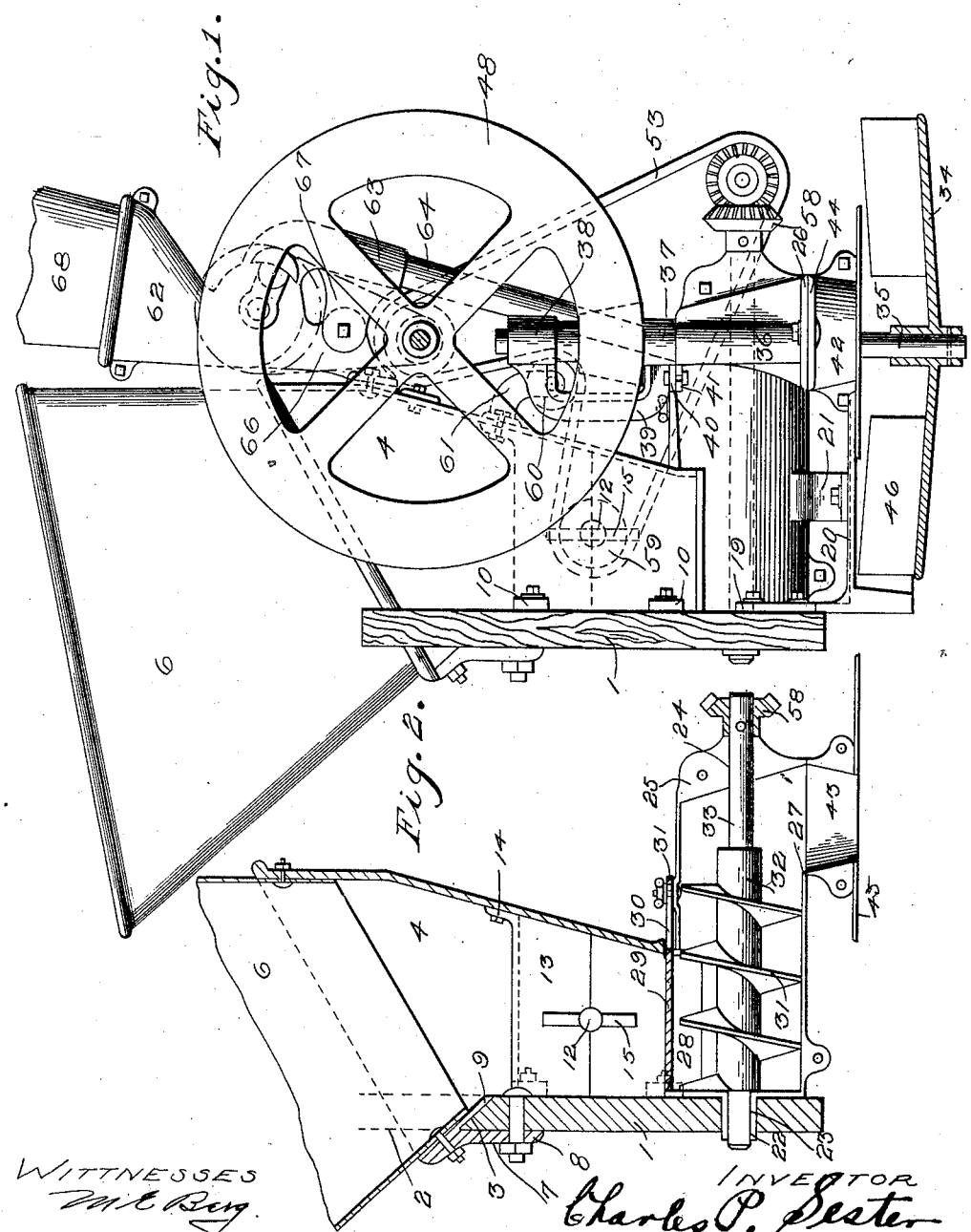

C. P. SESTER.
DISTRIBUTING MACHINE.
APPLICATION FILED JULY 22, 1912.
1,050,569.
Patented Jan. 14, 1913.
4 SHEETS—SHEET 2.
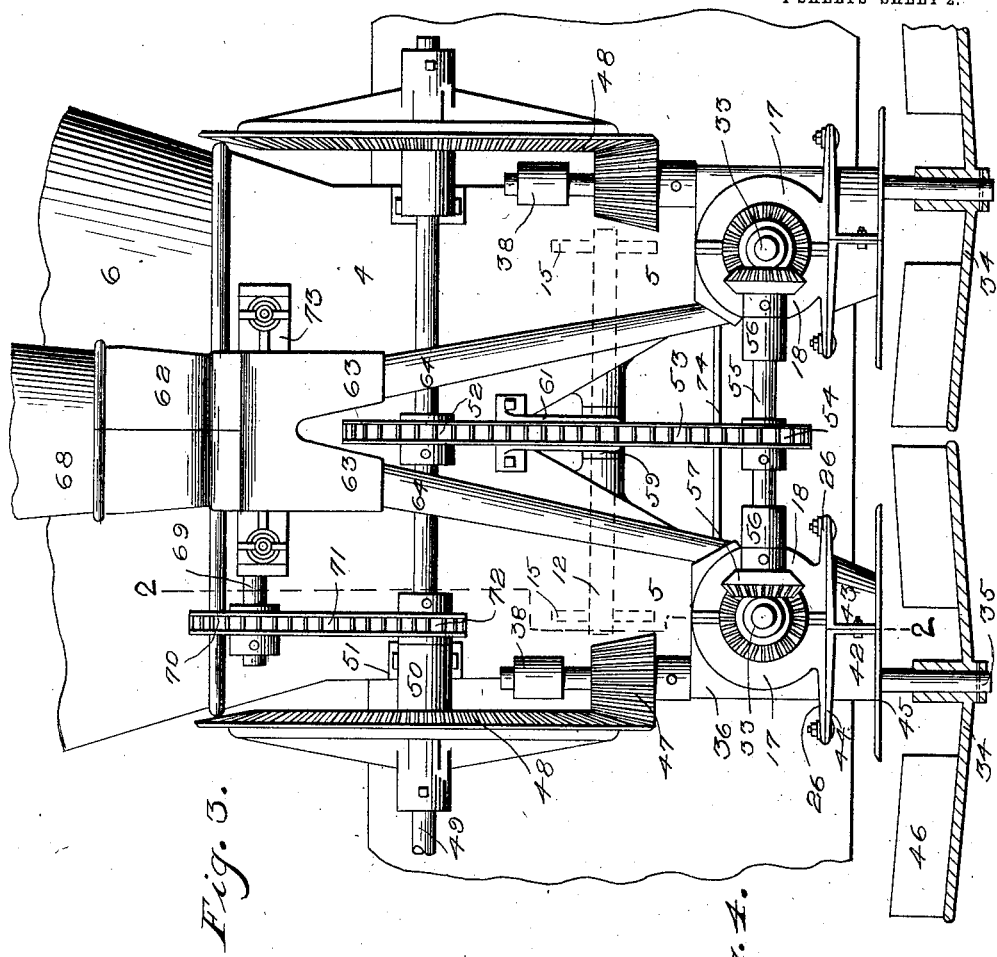

C. P. SESTER.
DISTRIBUTING MACHINE.
APPLICATION FILED JULY 22, 1912.
1,050,569.
Patented Jan. 14, 1913.
4 SHEETS—SHEET 3.
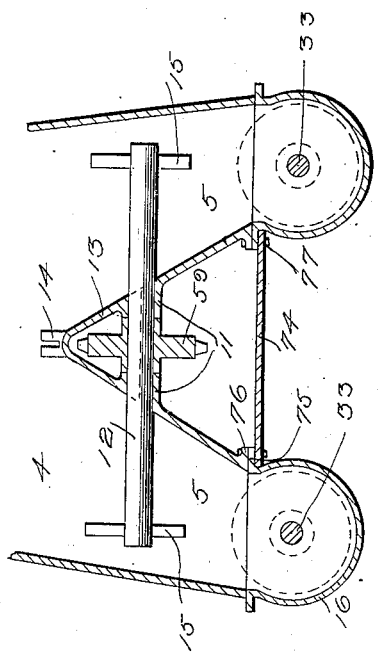
WITTNESSES
INVENTOR
Charles P. Sester
By LaPorte & Bean
Attys

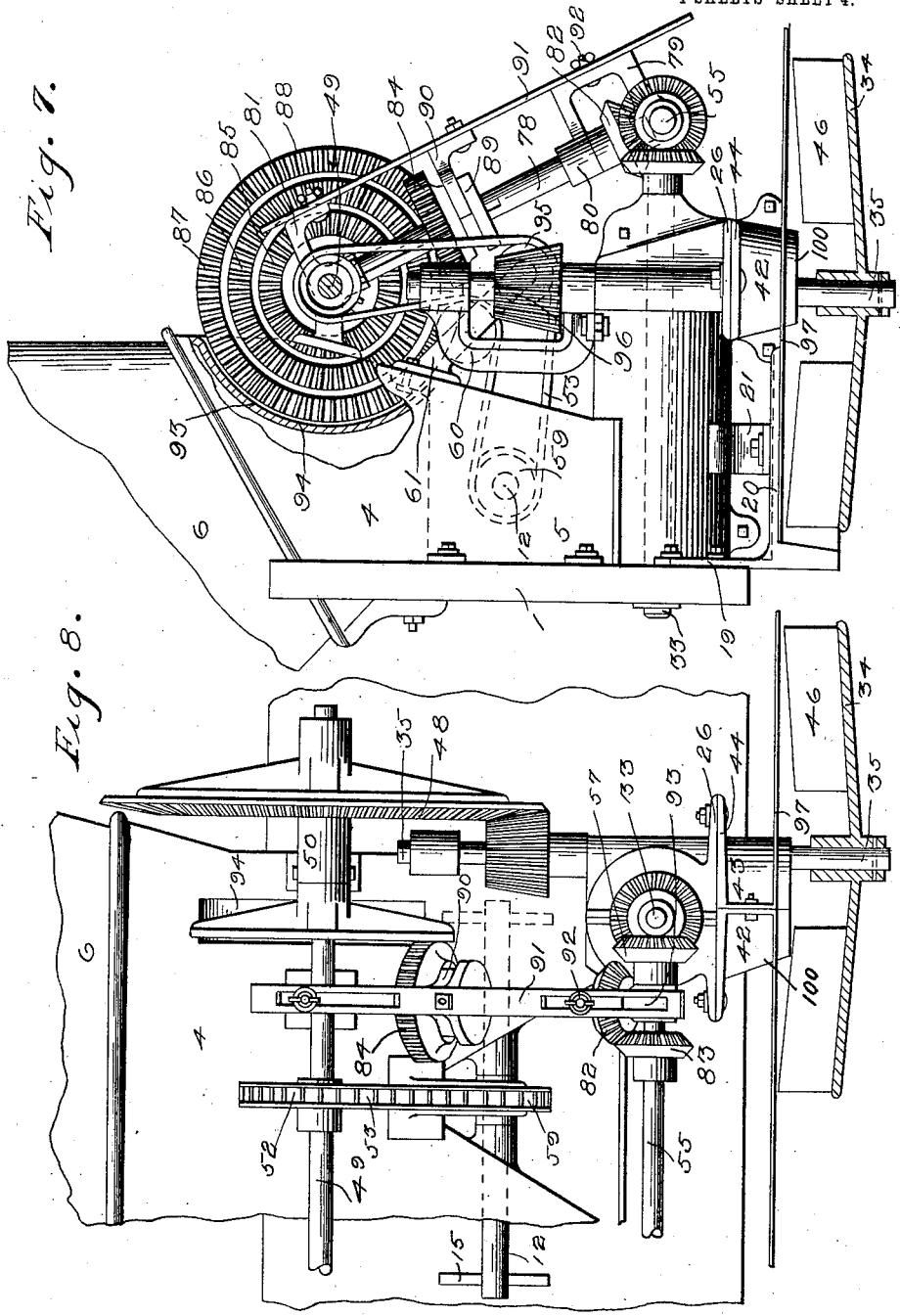

UNITED STATES PATENT OFFICE.

CHARLES P. SESTER, OF PEORIA, ILLINOIS.

DISTRIBUTING-MACHINE.

1,050,569.  Specification of Letters Patent.  Patented Jan. 14, 1913.

Application filed July 22, 1912. Serial No. 710,804.

*To all whom it may concern:*

Be it known that I, CHARLES P. SESTER, a citizen of the United States, residing at Peoria, in the county of Peoria and State of Illinois, have invented certain new and useful Improvements in Distributing-Machines, of which the following is a specification.

This invention has reference to a distributing machine and relates particularly to a distributer which is adapted to be attached to or supported by the end-gate or tail-board of a wagon, and includes means for spreading broadcast over a field the material which it is desired to distribute.

The invention has for its principal object to provide a machine of the character described which includes feeding and distributing means adapted to distribute broadcast over a field, grain, seed or a suitable fertilizing material; said feeding means including a material holding receptacle; auger or screw feeding means beneath the receptacle, and distributing fans beneath the discharge end of the auger feeding means.

The invention has for a further object a distributing machine adapted for use in distributing broadcast over a field, seed, grain or a suitable fertilizing material; said machine being suitably supported on the outside or rear face of an end-gate or tail-board for a wagon and includes a hopper support, and a hopper which will be largely within the body of the wagon when the board is in place on the wagon, to facilitate in the easy handling of the material to be shoveled into the hopper from the wagon, and auger feeding means carried entirely upon the outside or rear of the end-gate, and distributing fans at the outer or discharge ends of said augers for receiving and distributing said material.

The invention has for a further object a distributer supported on or attached to the end-gate or tail-board of a wagon; said distributer including a receptacle for containing the material to be distributed; feeding means adapted to receive the material from said receptacle, and fans to distribute the material broadcast over a field; said feeding means being driven by changeable speed gearing for regulating the quantity of material distributed to each acre of ground.

In the drawings:—Figure 1 is a side elevation of a distributing machine embodying my improvements, the distributing fan shown in cross-section; said machine as shown, being more especially adapted for use as a grain or seed distributing machine; Fig. 2 is a vertical sectional view, in side elevation, as the same would appear if taken on the line 2—2 Fig. 3, showing the end-gate, hopper support, portion of the hopper and one of the auger feeding means, other parts being omitted; Fig. 3 is rear elevation of the machine, the fans shown in section, and the opposite ends of the end-gate broken away; Fig. 4 is a cross section of one of the auger feeds, supporting casing, and a part of the fan beneath, as the same would appear if taken on the line 4—4 of Fig. 5; Fig. 5 is a plan view of the machine shown in Fig. 1, omitting the hopper and the gearing; the fans being shown in dotted lines; Fig. 6 is a vertical cross-section through the auger feeds and hopper support, as the same would appear if taken on the line 6—6 of Fig. 5, showing the means for feeding material to the augers; Fig. 7 is a side elevation partly in section of the machine, which is similar to that shown in Fig. 1, with the exception, that the machine is especially adapted for distributing fertilizing material and has embodied therein changeable speed gearing for operating the auger feed; Fig. 8 is an elevation similar to Fig. 3, with the exception, that only one side of the machine is shown, for the purpose of illustrating an adaptation and arrangement of the changeable speed gearing, when the machine is used as a fertilizer distributer.

Like characters of reference denote corresponding parts through the figures.

The end-gate or tail-board which supports the machine is indicated as 1. This end-gate is adapted to form the closure for the rear end of a wagon body, to which the same may be attached in any suitable manner. Said end-gate, approximately centrally of its length and at the upper edge thereof is provided with a cut out portion 2, best seen in Fig. 2, and such cut out portion is of a suitable width and also a suitable depth, the lower wall of the cut out portion being beveled as at 3. The end-gate is cut out at the upper edge in the manner described for convenience in supporting a hopper support and a hopper on the end-gate, and which also makes it possible for placing the hopper as low as desirable on the end-gate, which said hopper will project into the inside of the wagon box when the end-gate is attached thereto.

The hopper support is designated as 4 and is formed with the diverging legs 5, best seen in Fig. 3. Said hopper support is closed on three sides and is open in the rear, the end-gate forming the closure for the rear side of the hopper support and the legs 5, as shown in Fig. 2. The inner edge of the outside wall of the legs and the upper portion of the hopper support conform to the front wall of the end-gate, the cut out portion 2 and inclined wall 3 of said cut out portion 2 of said end-gate. The hopper support 4, supports a hopper 6; said hopper having a tapering wall and the same fits down into the hopper support 4, best seen in Fig. 2. The hopper 6 is suitably secured to the front and side walls of the hopper support 4 and also to a bracket 7 which fits over the lower wall 3 of the cut out portion 2 of the end-gate. The bracket 7 is best seen in cross-section in Fig. 2, and is shown having the vertical wall 8 adapted to engage with the face of the end-gate 1 and also provided with the inclined portion 9 which rests on and bears against the beveled wall 3 of the cut out portion 2. Said inclined wall 9 of the bracket extending upwardly a suitable distance and is adapted to receive and have secured thereto, by any suitable means, the rear wall of the hopper 6. The bracket 7 preferably extends the full width of the opening 2 in the end-gate and forms the rear wall of that portion of the hopper 6 which extends above the wall 3 of the cut out portion 2 of the end-gate, and provides the support, as indicated, for the rear wall of the hopper 6. Cutting out the end-gate in the manner indicated at 2 and supporting the hopper 6, so as to extend upwardly and rearwardly through said cut out portion, I am enabled to position the hopper largely within the body of the wagon box when the end-gate is attached to said wagon box and in position low enough on the bed of the wagon to facilitate in the filling of the hopper with material to be discharged on the ground, without danger of spilling the material through the lurching of the wagon when the operator is shoveling the material from the wagon box into the hopper. The hopper support 4 on the sides of the legs 5 is provided with ears 10, seen in Fig. 1 which are bolted or otherwise suitably secured to the end-gate 1 for securely attaching the hopper support and the legs 5 to the end-gate.

The inner walls of the legs 5 of the hopper support 4 are provided with half boxings 11, see Fig. 6, in which a shaft 12 is journaled, said shaft extending part way through the legs 5, also shown in Fig. 6, and the other half portion of said boxings 11 are formed by a cap plate 13 provided with ears 14 for securing the same to the front wall of the hopper support 4. Said cap plate 13 also serving as a dividing wall for the center of the hopper support and for the further purpose of dividing the material and directing the same down through the opposite legs 5 of said hopper support 4. The shaft 12 is an agitator shaft and carries the agitators 15 within the legs 5 and serves the purpose of stirring and agitating the material passing through the legs 5 of the hopper support to the feeding means supported beneath each of the legs 5, which will be hereinafter described.

I wish to point out particularly that the hopper support 4, when the end-gate or tail-board 1 is secured to the end of the wagon to form a closure therefor, is entirely upon the outside of said end-gate, and will be positioned upon the outside and at the rear end of the wagon box and that therefore the feeding and distributing mechanism which I am now about to describe is also located upon the outside of the end-gate and is also upon the outside of and at the rear end of the wagon box.

16 designates duplicate tubular casings, one located beneath each of the lower open ends of the legs 5 of the hopper support 4. Said casings 16 are formed of the semi-circular parts 17 and 18, see Fig. 3, and which may be suitably joined together. The tubular casings 16 are supported and extend rearwardly from the outside of the end-gate 1, as best seen in Fig. 1, by means of the ears 19 which extend from the semi-circular parts 17 and 18 and which may be bolted or otherwise suitably secured to the end-gate 1. Said tubular casings 16 are also supported by a shield 20, by means of legs 21, which depend from the sections of said tubular casings and are bolted or otherwise suitably secured to the shield 20, see Fig. 1. The inner ends of the semi-circular parts 17 and 18, see Fig. 2, are provided with the semi-circular bearing portions 22 which together form a boxing extending through an opening 23 in the end-gate or tail-board 1, and the opposite or forward ends of said semi-circular parts 17 and 18, are formed with the half boxings 24 which together form a bearing for a shaft to be described and said half boxings 24 merge into ears 25 which may be suitably secured for connecting the forward ends of the semi-circular parts 17 and 18 at their forward ends and also provided with the lower laterally extended flanges or bearing plates 26, to which may be suitably attached certain feed-ways to be described.

The casings 16, for the greater portion of their length, are formed with closed bottoms, but are provided with openings 27 at their forward ends for the discharge of material fed through said casings; and said casings 16 are closed for the greater portion of their length in the upper part, but are provided with openings 28 at their inner ends, which said openings coincide with the lower end of the legs 5 of the hopper support 4. If the machine is used as a broadcast distributer for grain or seed, the openings at the lower ends of the legs 5 of the hopper support 4 of the casings 16 are controlled by slide valves 29, whereby to regulate the quantity of seed or grain deposited into the casings 16, which will regulate the amount of grain or seed sown to the acre. Said slide valves 29 when closed, abut with the end-gate 1 and are provided with the longitudinal slots 30 through which is carried the adjusting screws 31 which pass through the upper wall of the casings 16 and the slot 30 in said valve, which when adjusted will permit the valves 30 to be moved for regulating the size of the opening at the bottom of the legs of the hopper support, or closed as may be desired.

The casings 16 may be of any suitable length, preferably extending from the outside rear face of the end-gate or tail-board 1 to a suitable point beyond the outside of the rear wall of the legs 5 of the hopper support 4, and in said casings are carried augers 31 attached to or forming a part of sleeves 32 secured on a shaft 33 extending longitudinally of the casings 16, which at their inner end have a bearing in the half boxings 24 of the said semi-circular parts of the casings 16. These augers 31 may be of any suitable construction and have as many blades as may be desired, the functions of which as will be understood, is to convey material received in the casings through the openings 28 from the legs 5 of the hopper support 4, and to cause the same to be discharged downwardly through the openings 27 in the lower forward ends of said casings 16.

When the machine is used for distributing a fertilizing material, being such a machine as shown in Fig. 7, the slide valves 30 are done away with and the quantity of material to be sown to the acre is governed or regulated by certain changeable speed gearing which operates the auger shafts 33, in a manner hereinafter described. Under the forward ends of the casings 16 and adapted to receive material discharged through the openings 27 in said casings 16, are the distributing fans 34, see Figs. 1 and 3. These distributing fans may be of any suitable construction and are journaled on the lower ends of fan shafts 35. These shafts are carried up through and have a bearing in bosses 36 formed on or attached to the outside of the semi-circular parts 17 of the casings 16 and said shafts extend up a suitable distance above the casings 16 and are journaled in spaced bearings 37 and 38 forming a part of or attached to arms 39, which said arms at their lower ends are provided with ears 40 suitably bolted or otherwise secured to ears 41 on the casings 16. Interposed between the fans 34 and the openings 27 in the casings 16 are feed ways 100 formed of parts 42 and 43 suitably secured together, which said parts have flanges 44 which are bolted or otherwise suitably secured to the flanges 26 of the parts 17 and 18 of the casings 16. Said feedways have flanges 45 overlying the central portion of the fans and such feed-ways when they are used in connection with a distributer for distributing grain or seed, the flanges 45 thereof cover the central portions of the fans. The arrangement of the feed-ways between the casings 16 and the fans is best seen in Fig. 4, which also shows the manner of forming the bearings for the fan shafts 35 on the casings 16. It will be observed that the fan shafts 35 extend up through the feed-ways, below the openings 27 in the casings 16, and the construction of said feed-ways is such that the material discharged from the casings 16 is deposited directly upon the fans and the flanges 45 prevent the promiscuous spreading of material on the fans, and from the same, except by means of the wings 46 on the fans, which are suitably arranged for the proper distribution of the material from said fans.

On the upper ends of shafts 35 and between the bearings 37 and 38 are carried beveled pinions 47 and said beveled pinions are operated by gears 48 carried on a driving shaft 49 which is adapted to receive its power from one of the ground wheels of the wagon in the usual manner, when the end-gate 1 has been secured to the wagon body. Although this driving means from the driving wheel of the wagon, for the driving shaft 49 is not shown, said driving means consists usually of a chain connection from a sprocket wheel which is attached to the ground wheel of the wagon and in engagement with a sprocket wheel carried on the outer end of the driving shaft 49. The shaft 49 has a bearing in boxings 50 which are carried by arms 51 secured to and projecting from the outside wall of the hopper support 4, as shown in Fig. 3. Disposed approximately centrally on the shaft 49 is a sprocket wheel 52 and driven by this sprocket wheel 52 is a sprocket chain 53, said sprocket chain extending down and around a sprocket pinion 54 on a cross-shaft 55. This cross-shaft 55 is journaled in supporting arms 56 extending forwardly from the front ends of the casings 16 and on the opposite ends of said cross-shaft 55 are carried beveled pinions 57 which mesh with and drive beveled pinions 58 on the outer ends of the auger shafts 33. The sprocket chain 53, above referred to as passing around the sprocket pinions 54 on the cross-shaft 55, extends toward the end-gate and between the legs 5 of the hopper support 4 and engages and passes around a sprocket pinion 59 carried on the agitator shaft 12, best shown in Fig. 6; said sprocket chain 59 is directed around an idler wheel 60 and thence to the sprocket wheel 52 on the shaft 49. The idler wheel 60 is carried by a bracket 61 secured to the outside wall of the hopper support 4, in the manner shown in Fig. 1. The driving means which has just been described for the cross-shaft 55 and the sprocket chain 53 is such as I employ when the machine is used as a broadcast distributer for grain or seed, but such driving mechanism is changed or modified when the machine is used as a fertilizer distributer, in a manner which I will hereinafter explain.

Referring to the shield 20, the same is best seen in plan Fig. 5 where it is shown bolted or otherwise suitably secured to the end-gate 1 for supporting it in its proper relation on said end-gate and above the fans 34.

I have shown in Figs. 1 and 3 a grass seed attachment which I prefer to use when the machine is used as a broadcast distributer for seed or grain. This attachment comprises the hopper support 62; the diverging legs 63 to which are connected tubes 64 and said tubes at their lower ends communicate with inlet openings 65 in the forward ends of the semicircular portions 18 of the casings 16, whereby to discharge the grass seed from the attachment into the front ends of the casings 16 at a point where the same may suitably commingle with the grain or seed and at about the point where the same is discharged from the casings 16 on to the discharge fans 34. The hopper support 62 and attachment, is supported from the main hopper support 4 by ears 66 bolted or otherwise suitably secured to the hopper support 4, and the diverging legs for receiving and conveying the grass seed from the hopper are supported from said hopper support by ears 67 which are bolted or otherwise suitably secured to the ears 66. Connected with the hopper support 62 is a hopper 68. In the grass seed attachment may be provided any suitable mechanism, such as a fluted roller, not shown, for feeding the grass seed from the hopper support 62 into the legs 63, and if such a mechanism is employed, the same will be driven by a shaft 69 on which is carried a sprocket wheel 70 driven by a sprocket chain 71 from a sprocket wheel 72 on the driving shaft 49; and if desired, valves 73, see Fig. 3, may be employed for regulating the quantity of grass seed fed from the hopper support 62 into the legs 63. As an additional supporting means for securing the casings 16 to the legs 5 and to each other, I provide the connecting plate 74, best seen in Fig. 6, which extends between the casings 16 and is bolted to the inwardly extending flanges 75 of said casings and to the flanges 76 of the legs 5, by means of bolts 77. Such connecting plate assists in sustaining the casings 16 in permanent relation with the lower ends of the legs 5 of the hopper support 4 and will prevent any sagging of the parts resulting from the constant vibration of the machine parts.

In Figs. 7 and 8 I have shown substantially the same mechanism which is shown in Figs. 1 and 3, with the exception of the grass seed attachment, the valve plates 29 and the driving means for the shaft 49 for actuating the shaft 55 to operate the auger shafts 33 therefrom; substituting for the driving mechanism for operation the cross-shaft 55, shown in Figs. 1 and 3, a changeable speed gearing which I will now describe, such gearing being employed in connection with the other mechanism as a fertilizer distributer, instead of as a distributer for grain or seed. I operate the cross-shaft 55 from the driving shaft 49 by means of the vertically inclined shaft 78, said shaft being journaled at its lower end in a bracket 79, said bracket 79 having a bearing on the shaft 55 and formed with a spaced hub 80, therefrom, through which the shaft 78 is carried, as shown in Fig. 7 and the upper end of the shaft 78 is journaled in a bracket 81 which has a bearing portion to receive the shaft 49 and said bracket 81 is secured to the outer wall of the hopper support 4, best seen in Fig. 7. On the shaft 78 and between the bearing portions of the bracket 79, is carried a bevel pinion 82, which meshes with and drives a bevel pinion 83 on the cross-shaft 55. The shaft 78 has feathered or slidably keyed thereon, to be moved longitudinally thereof a suitable gear wheel 84, and said gear wheel 84 is adapted to be moved into and out of mesh with a plurality of gears 85, 86 and 87 on the supporting wheel 88, carried and driven by the shaft 49. The wheel 84 is formed with a grooved sleeve 89 which is engaged by the fork 90 carried on the rod or bar 91 and adapted to be moved longitudinally of the shaft 78 and when so moved to adjust the wheel 84 on the shaft 78 and into engagement with either one of the gears 85, 86 and 87 of the wheel 88. The bar 91 is slidable upon and adapted to be fixed in adjusted positions on the brackets 79 and 81 by means of adjusting screws 92 which are operable in the elongated slots 93 in said bar 91. By adjusting the gear 84 on the shaft 78 I am enabled to change the speed of the shaft 78, the shaft 55 and the auger shafts 33 which will result in controlling the operation of the augers to control the quantity of fertilizing material to be distributed by the fans. In other words, when the gear 84 is in mesh with either of the gears 85, 86 and 87 it will be understood by the operator that a predetermined amount of the fertilizer will be distributed per acre over the ground. If desired the face of the bar 91 may be arranged with a scale to indicate the amount of material to be discharged per acre over the ground and when so adjusted the gear 84 will be moved into mesh with either of the gears 85, 86 and 87.

The wheel 88, containing the gears 85, 86 and 87, is of such a diameter that it is preferable to cast the hopper support 4 with a pocket, indicated as 93, in the front wall thereof, in which the wheel 88 may operate; said pocket formed with a curved wall 94, conforming to the peripheral face of the gear 88 and also forms a closure for the pocket to retain the material within the hopper support as it finds its way down into the legs 5 thereof.

Employing the gearing, shown in Figs. 7 and 8, for operating the cross-shaft 55, from the drive shaft 49, makes it necessary to modify the arrangement of the drive for the agitator shaft 12 from said shaft 49, and I do this by carrying the chain 53 around an additional idler wheel 95 journaled in an extension 96 of the bracket 61, best seen in Fig. 7.

When using the machine for distributing fertilizer material I prefer to change the form of the shield or flanges 97 which overlie the central portion of the fans 34, and are attached to the feed-ways 100. On account of the nature of the fertilizer material which is to be distributed upon the fans, the same will create considerable dust and has a tendency to spread and rise and cover the gearing of the machine, I do away with the flanges 45 on the feed-ways 100 and provide the shield 97 shown in Figs. 7 and 8. This shield is long enough to cover the entire surface of both of the fans 34 and to extend beyond the same, and in width, extend from the rear edge of the shield 20 out beyond the edge of the said fans 34. This shield 97 is also provided with openings not shown, but through which the feed-ways 100 formed of the sections 42 and 43 project, as shown in Figs. 7 and 8. With a shield such as shown at 97, when the fertilizer material is distributed through the feed-ways on to the fans, the dust will be held down on to the fans, and the gearing and other machine parts will thereby be protected.

What I claim is:—

1. In a device of the character described, in combination, an end-gate for a wagon, a hopper support attached to and supported entirely upon one side of said end-gate, a hopper attached to said hopper support and extending over on to the opposite side of said end-gate, a pair of cylindrical casings supported below said hopper support and on the same side of the end-gate therewith and having feed openings communicating with said hopper support, said casings abutting at their inner ends with the end-gate and extending rearwardly therefrom and beyond the lower portion of the hopper support, feeding means in said casings, distributing fans below said casings, means for operating said fans, and means for operating the feeding means in said casings.

2. In a device of the character described, in combination, an end-gate for a wagon, a hopper support attached to and supported entirely upon one side of said end-gate, a hopper attached to said hopper support and extending over on to the opposite side of said end-gate, a pair of cylindrical casings supported below said hopper support and on the same side of the end-gate therewith and having feed openings communicating with said hopper support, said casings abutting at their inner ends with the end-gate and extending rearwardly therefrom and beyond the lower portion of the hopper support, feeding means in said casings, distributing fans below said casings, a driving shaft, means for operating the fans from the driving shaft, and changeable speed gearing for operating said feeding means in the casings from said driving shaft.

3. In a device of the character described, in combination, an end-gate for a wagon, a hopper support attached to and supported entirely upon one side of said end-gate, a hopper attached to said hopper support and extending over on to the opposite side of said end-gate, a pair of cylindrical casings supported below said hopper support and on the same side of the end-gate therewith and having feed openings communicating with said hopper support, said casings abutting at their inner ends with the end-gate and extending rearwardly therefrom and beyond the lower portion of the hopper support, shafts in said casings, augers on said shafts, a driving shaft, gearing for operating said auger shafts from said driving shaft, said gearing including means for adjusting the same to change the speed of said auger shafts, distributing fans below said casings, and means for operating said fans from said driving shaft.

4. In a device of the character described, in combination, an end-gate for a wagon, a hopper support attached to and supported entirely upon one side of said end-gate, a hopper attached to said hopper support and extending over on to the opposite side of said end-gate, a pair of cylindrical casings supported below said hopper support and on the same side of the end-gate therewith and having feed openings communicating with said hopper support, said casings abutting at their inner ends with the end-gate and extending rearwardly therefrom and beyond the lower portion of the hopper support, shafts in said casings, augers on said shafts, a cross shaft, means for operating the auger shafts from the cross shaft, a driving shaft, changeable speed gearing between the cross shaft and the driving shaft and adapted to operate said cross shaft from said driving shaft, distributing fans below said casings, and means for operating said fans from the driving shaft.

5. In a device of the character described, in combination, an end-gate for a wagon, a hopper support attached to and supported entirely upon one side of said end-gate, a hopper attached to said hopper support and extending over on to the opposite side of said end-gate, a pair of cylindrical casings supported below said hopper support and on the same side of the end-gate therewith and having feed openings communicating with said hopper support, said casings abutting at their inner ends with the end-gate and extending rearwardly therefrom and beyond the lower portion of said hopper support, shafts in said casings, augers on said shafts, a cross shaft, means for operating the auger shafts from the cross shaft, a driving shaft, an upwardly extended shaft between the cross shaft and the driving shaft, gearing for operating the cross shaft from said upwardly extended shaft, gearing for driving the upwardly extended shaft from said driving shaft, said gearing being adjustable for changing the speed of rotation of said upwardly extended shaft, distributing fans below said casings, and means for operating said fans.

6. In a device of the character described, in combination, an end-gate for a wagon, said end-gate having a cut out portion in its upper edge, a hopper support attached to and supported entirely upon one side of said end-gate and including a front wall and side walls, a bracket attached to the end-gate and having a portion extending into the cut out portion of said end-gate, a hopper having its lower end inserted in the upper end of said hopper support and adapted to be secured to said hopper support and said bracket, and distributing means beneath said hopper support and adapted to receive material therefrom and supported upon the same side of the end-gate as said hopper support.

7. In a device of the character described, in combination, an end-gate for a wagon, said end-gate having a cut out portion in its upper edge, a hopper support attached to and supported entirely upon one side of said end-gate and including a body portion with front and side walls and diverging legs having front and side walls, a bracket attached to the end-gate and having a portion extending into the cut out portion of said end-gate, a hopper having its lower end inserted in the upper end of said hopper support and adapted to be secured to said hopper support and said bracket, and distributing means beneath said hopper support and adapted to receive material therefrom and supported upon the same side of the end-gate as said hopper support.

8. In a device of the character described, in combination, an end-gate for a wagon, said end-gate having a cut out portion in its upper edge, a hopper support attached to and supported entirely upon one side of said end-gate and including a body portion with front and side walls and diverging legs having front and side walls, a bracket attached to the end-gate and having a portion extending into the cut out portion of said end-gate, a hopper having its lower end inserted in the upper end of said hopper support and adapted to be secured to said hopper support and said bracket, auger feeding means beneath each of said legs of the hopper support, and distributing means arranged to receive material fed by said augers and for distributing the same broadcast over the ground.

9. In a device of the character described, in combination, an end-gate for a wagon, a hopper support attached to and supported entirely upon one side of said end-gate, a hopper supported by said hopper support and said end-gate and extending over on to the opposite side of said end-gate, a pair of cylindrical casings supported below said hopper support and on the same side of the end-gate therewith and having a feed opening at one end communicating with said hopper support and a discharge opening at their opposite ends, a shaft in each casing, said shaft journaled in the forward ends of the casings and having their opposite ends journaled in the end-gate, feeding means on said shafts, distributing fans below the discharge openings in said casings, means for operating said fans, and means for operating said shafts.

10. In a device of the character described, in combination, an end-gate for a wagon, a support attached to and supported upon one side of said end-gate and provided with diverging legs opening at their lower ends, cylindrical casings supported on the same side of the end-gate with said support and beneath the open ends of the legs of said support, a shaft carried in each of such casings, said shafts journaled at one end in said casings and at their opposite ends in the end-gate, augers on said shafts, distributing fans adapted to receive material from said casings, means for operating said fans, and means for operating said shafts.

11. In a device of the character described, in combination, an end-gate for a wagon, a support attached to and supported by said end-gate, said support having diverging legs, a pair of cylindrical casings supported by said end-gate upon the same side as said support and beneath said legs, a sustaining plate extending between said casings and connected to the same and said legs, feeding means in said casings, means for operating said feeding means, distributing fans below said casings and adapted to receive material discharged therefrom, means for operating said fans, and a shield below said casings and covering said fans, said shield being long enough to extend from the outside of one of said fans to the outside of the other of said fans and being wide enough to cover the front and rear sweeps of said fans.

12. In a device of the character described, in combination, an end-gate for a wagon, a support attached to and supported by said end-gate, said support having diverging legs, casings supported beneath each of said legs, feeding means in each of said casings, a driving shaft, a cross shaft means for operating the feeding means in the casings from said cross shaft, a driving wheel on the driving shaft, said driving wheel provided with a plurality of gears, a shaft extending between the cross shaft and the driving shaft, gearing between the cross shaft and said last mentioned shaft, and a gear slidable on said last mentioned shaft and adapted to be moved into and out of mesh with the gears on the wheel on said driving shaft, means for sliding said sliding gear, distributing fans below the casings, and means for operating the fans from said driving shaft.

13. In a broadcast distributer, including feeding means and distributing fans; a driving mechanism for said feeding means including a driving shaft, a cross shaft and means thereon for operating the feeding means, a shaft extending between the cross shaft and the driving shaft, a driving wheel on the driving shaft provided with a plurality of gears, gearing means between the cross shaft and said shaft extending between the cross shaft and the driving shaft, a gear wheel feathered or keyed on said shaft and extending between the cross shaft and the driving shaft and adapted to have a slidable relation thereon for placing said gear in mesh with either of said gears on the wheel on the driving shaft, an adjusting member, and means on said adjusting member and connected with said sliding gear for adjusting said sliding gear simultaneously with the adjustment of said adjusting member.

In testimony whereof I affix my signature, in presence of two witnesses.

CHARLES P. SESTER.

Witnesses:
CHAS. H. LA PORTE,
MILDRED F. BOMAN.